United States Patent [19]

Mori et al.

[11] 4,327,840
[45] May 4, 1982

[54] METAL CAP AND ITS METHOD OF MANUFACTURE

[75] Inventors: Fumio Mori; Kazuhisa Ishibashi, both of Yokohama, Japan

[73] Assignee: Toyo Seikan Kaisha, Ltd., Tokyo, Japan

[21] Appl. No.: 202,343

[22] Filed: Oct. 29, 1980

Related U.S. Application Data

[62] Division of Ser. No. 39,119, May 15, 1979, Pat. No. 4,272,313.

[30] Foreign Application Priority Data

May 26, 1978 [JP] Japan ................... 52-62305

[51] Int. Cl.³ .................. B65D 41/02; B65D 53/04
[52] U.S. Cl. .................. 215/349; 156/275.3; 215/DIG. 2; 219/10.43; 413/58
[58] Field of Search ......... 215/232, 349, 341, DIG. 2; 113/121 A, 80 DA, 80 D; 219/10.43; 156/272, 262

[56] References Cited

U.S. PATENT DOCUMENTS

| | | | |
|---|---|---|---|
| 1,603,786 | 10/1926 | Marsa | 113/80 D |
| 2,184,281 | 12/1939 | Clark | 156/272 |
| 3,183,144 | 5/1965 | Caviglia | 215/349 |
| 3,460,310 | 8/1969 | Adcock | 156/272 |
| 3,581,690 | 6/1971 | Zapata | 113/80 DA |
| 3,749,272 | 7/1973 | Brockett et al. | 215/341 |
| 3,916,055 | 10/1975 | Wagner | 156/308.2 |
| 3,928,109 | 12/1975 | Pollock | 156/272 |
| 3,996,090 | 12/1976 | Leatherman | 156/272 |

Primary Examiner—Michael G. Wityshyn
Attorney, Agent, or Firm—Pennie & Edmonds

[57] ABSTRACT

A metal cap having a primer layer thereon which has a thermal adhesiveness with respect to a lining layer and wherein part of the lining at the bottom of a cap is thermally adhesively fixed to the primer layer.

A method of manufacturing a metal cap including steps of applying a primer to the cap which has a thermal adhesiveness with respect to a lining layer and heating only a portion of the bottom of the cap to cause only part of the lining to become affixed to the primer.

3 Claims, 8 Drawing Figures

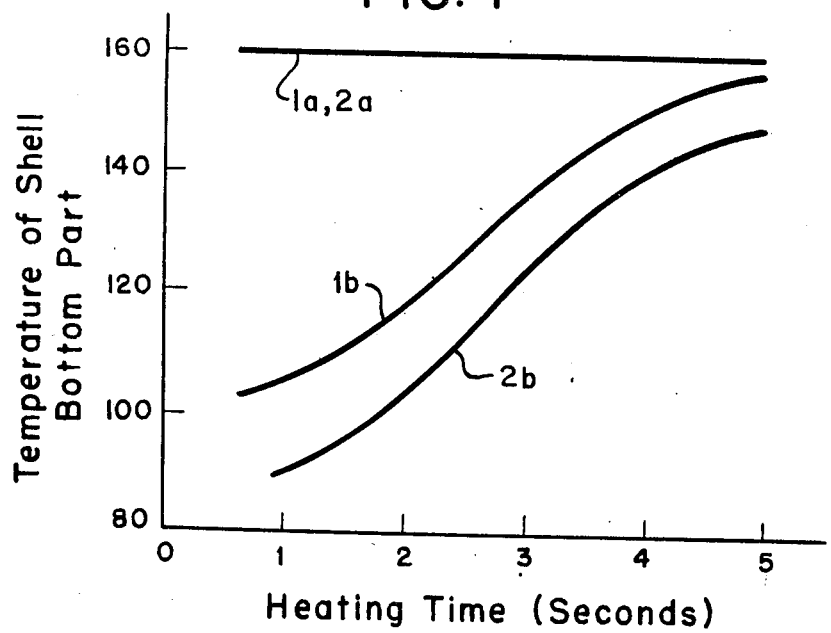
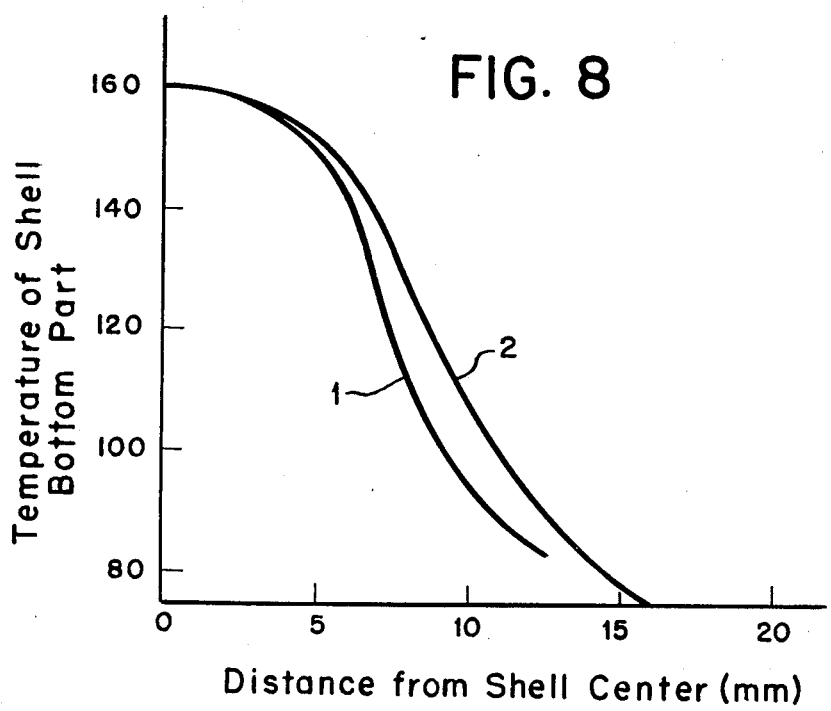

METAL CAP AND ITS METHOD OF MANUFACTURE

This is a division, of application Ser. No. 39,119, filed May 15, 1979, now U.S. Pat. No. 4,272,313.

TECHNICAL FIELD

The invention relates to a metal cap and a method for its manufacture where the cap is adapted to seal the open ends of containers and where the cap has a lining layer thermally adhesively affixed to a primer layer contained on the cap over a portion of the inside bottom surface of the cap.

BACKGROUND ART

Metal caps are used for sealing the open ends of containers such as bottles or wide neck jars and comprise a metal shell to which a lining layer has been added. The metal shells are made by shallow stamping or deep stamping of metal sheets with threading or pleated flare processing added as required. Specifically metal caps include items such as crowns, screw caps, pilfer-proof caps and twist-off caps. The metal shell portion of the caps may be uncoated, may be treated with an anti-corrosion coating, and may have printing applied. Shell materials suited for use in the present invention include both non-magnetic metal materials such as aluminum, aluminum alloy, copper and brass and magnetic metal materials such as tin plate, tin free steel and coated steel plate.

In order to prevent the seal lining layer used in a cap from separating from the cap during transport or during supply to cap supply chutes in packing and sealing apparatus, the lining layer is ordinarily adhered to the entire inner surface of the bottom of the metal shell by means of a primer layer. However, with the recent appearance of caps, and particularly crowns, used as prizes, there have been various proposals for metal caps in which the lining layers are easily peelable from the metal shells. Prize marketing caps include those having a winning ticket for a prize or other characters, codes or drawings printed as marks on the inside bottom surfaces of metal caps with the idea of promoting the marketing of the bottles. In order to make the peeling of the lining layer easy in this type of prize cap, only the center part of the lining layer is lightly affixed to the metal cap leaving all or part of the outer periphery of the lining layer in a non-adhesive state. For example, the method of manufacture of some caps includes the step of having adhesive primer painted only in the center part of the bottom inside surface of the metal shells, while other methods included having the entire bottom inside surface of the shells painted with adhesive primer, and then having ink that will prevent adhesion between the lining layer and adhesive primer painted in part or all of the outer periphery of the bottom surfaces. However, both of these methods require special types of primer painting apparatus adding a step to the manufacturing process and both methods require precise control of the painting process to prevent poor registration.

A problem which exists where a lining layer comprising a resin such as polyethylene is used, is that the lining layer, if it is adhered over the entire bottom surface of a cap, will tend to crack along its outer periphery over a period of time after bottling leading to a loss of sealability. This is in part due to stress cracking characteristics of polyethylene material.

It is therefore an object of the present invention to provide for a metal cap and method of manufacture of the same which does not require any complicated adhesive primer painting process to affix a part of a lining layer to a primer layer over a portion of the inside bottom surface of a metal cap.

DISCLOSURE OF INVENTION

Broadly a metal cap constructed according to the invention has a lining layer overlying a primer layer on the inside bottom surface of the cap. The primer layer has a thermal adhesiveness with respect to the lining layer such that when a portion of the bottom surface of the cap is heated, only that part of the lining layer at the heated portion will become affixed to the primer.

The method of manufacture of the cap described above includes applying heat to only the bottom portion of a metal cap where it is desired to have a lining material affixed to a primer. The heating of the bottom of the cap is preferably accomplished by inducing a high frequency electrical current in the portion of the cap where it is desired to have the lining layer affixed to the primer layer. The heating step can be done before application of the lining material in which event the lining material is cut from a sheet to a desired shape and pressed onto the heated portion of the bottom of the cap.

In a further embodiment, the lining material may be applied prior to heating in which event the material is pressed after heating by a cooled punch to shape the material into a sheet form.

BRIEF DESCRIPTION OF DRAWINGS

FIG. 7 is a graph illustrating the relation between heating time and temperature of a bottom of a metal shell; and FIG. 8 is a graph illustrating temperature variation in a bottom of a metal shell measured from the center of the cap.

BEST MODE FOR CARRYING OUT THE INVENTION

Figure 1:
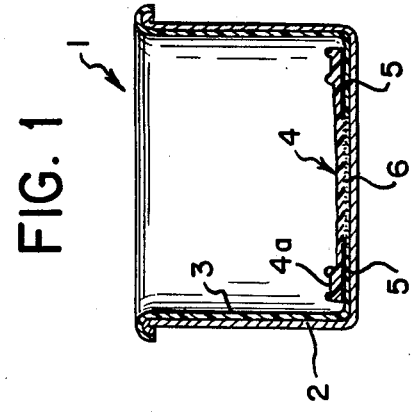
FIG. 1 is a side sectional view of a metal cap constructed according to the invention.

Referring to FIG. 1, there is illustrated a metal cap 1 having a metal shell 2 which forms the main body of the metal cap. The shell has an adhesive primer layer 3 thereon which may directly contact the shell or indirectly through means of an anti-corrosion coating interposed between the shell and the primer layer. As shown, a lining layer 4 is affixed to the primer layer 3 through a thermal adhesive portion 6 and contacts the primer layer through non-adhesive portions 5.

Figure 2:
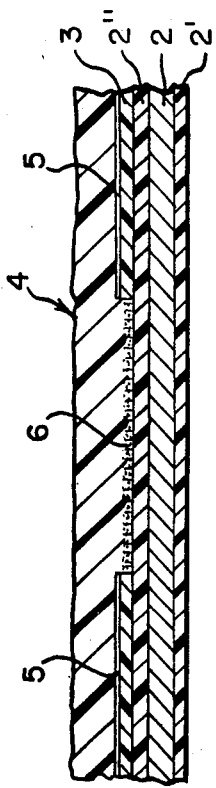
FIG. 2 is an enlarged view of the bottom portions of the cap of FIG. 1.

FIG. 2 illustrates in greater detail the positioning of the layers and in addition the positioning of anti-corrosion coatings 2' and 2" on the surface of the shell 2.

Figure 3:
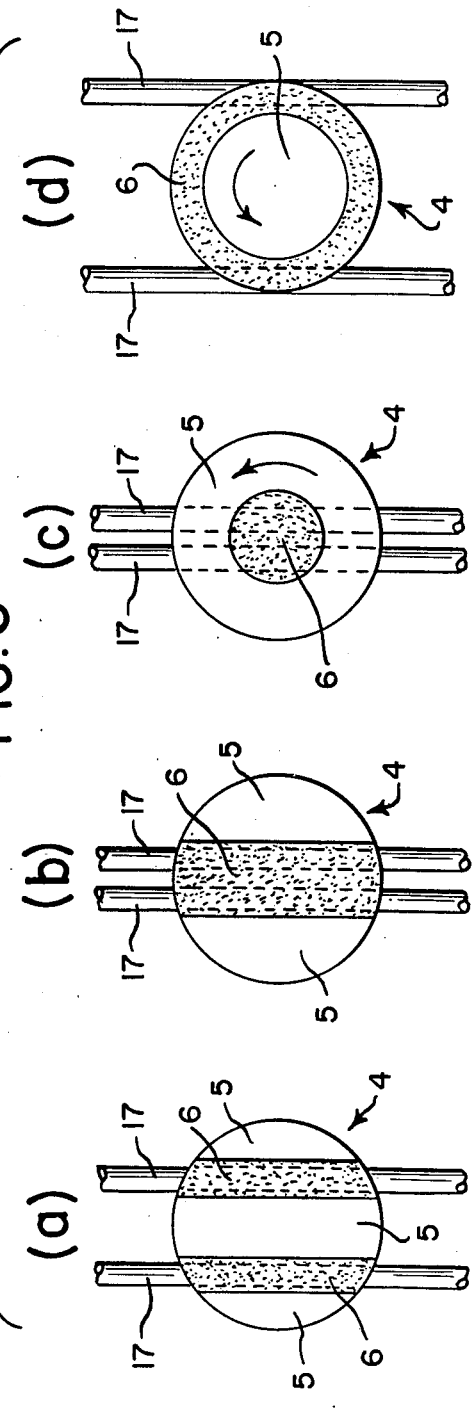
FIG. 3 is a diagrammatic plan view of the adhesive and non-adhesive areas of the lining layer available in a cap constructed according to FIG. 1.

Referring to FIGS. 3a-3d, there is illustrated the positioning of high frequency conductors 17 which are utilized to heat portions of the bottom of a shell in a manner described hereafter and which in addition illustrates various configurations of non-adhesive parts 5 and adhesive parts 6 that may be obtained by different positioning of the conductors 17. FIG. 3a illustrates adhesive part 6 extending in two parallel strips to divide the lining layer into three nearly equal parts with the widths of adhesive part 6 being either nearly equivalent to the outer diameters of the high frequency current conductors 17, or slightly larger. Non-adhesive parts 5 occupy the outside and inside of adhesive parts 6 and consequently non-adhesive parts 5 occupy the greater part of the inside and the greater part of the outer periphery of the lining layer. The outer periphery in this instance is taken to mean the part having an area inside and along the outer perimeter.

FIG. 3b shows adhesive part 6 extending through the area of the center of the lining layer and to make a near rectangular shape having a width a little larger than two times the outer diameter of the high frquency electric conductor 17. Here non-adhesive part 5 occupies the greater part of the outer periphery of the lining layer.

FIG. 3c shows adhesive part 6 formed in a nearly circular shape in the center of the lining layer, and as will be discussed later, this is the shape used when heating the shell while rotating it around its center over two adjoining high frequency current conductors 17 whose current directions are mutually opposite. In this case non-adhesive layer 5 occupies the entire portion of the outer periphery of the lining layer.

FIG. 3d is an example of the adhesive part 6 being formed to make a ring on the peripheral part of the lining layer. This is accomplished by positioning the conductors under the periphery of the shell bottom, and heating while rotating the shell.

The lining material used may include any thermoplastic resin (rubber included) having elastic properties suitable for use as a sealing material, for example soft vinyl chloride, styrene-butadiene-styrene copolymer, linear polyamide resin, fluorine resin and polyolfin resin. Since polyolefin resin such as polyethylene has superior sanitary, anti-moisture and mechanical properties, it is well suitable as lining material. Polyolefin resins that may be used include polyolfins such as low density, medium density and high density polyethylene, polypropylene, polybutene-1, ethylene-butene-1 copolymer and ethylene-propylene copolymer, ethylene-vinyl acetate copolymer, and modified polyolefins or olefin copolymers containing as their main ingredients olefins such as unsaturated carboxylic acid modified polyethylene or polypropylene, and considerable amounts of ethylene unsaturated monomer other than olefin. These olefin resins can be used singly or in combination of two or more, and they can also be blened with elastomers such as ethylene-propylene rubber and butyl rubber to improve the elastic properties needed for sealing materials. It is also possible to blend oxidation inhibitors, heat stabilizers, lubricants, fillers or colorants into these polyolefins. Further it is also possible to blend cross-linking agents and foaming agents either singly or in combination to obtain polyolefin resin of superior mechanical properties such as elasticity.

These lining layers may be in the form of flat sheets, or as shown in FIG. 1, they may be furnished with a peripheral projection that contacts the upper end of the container mouth and this projection may assume an annular shape that clasps both sides of the mouth as required.

While it is important that the primer material have a thermal adhesiveness to the lining material comprising a thermoplastic resin, it is also important that the primer material has adhesiveness to the metal shell itself or to the anti-corrosion coating 2' formed on its inner surface. This is important in order to prevent the lining layer from separating from the metal shell during transport or during supply to the cap supply chute of the packing and sealing apparatus and also to prevent leakage of the liquid contents as described later.

Examples of such primer materials are adhesive resins such as ethylene-vinyl acetate copolymer, ethylene-acrylic acid ester copolymer, epoxy, polyurethane, polybutadiene, epoxyurethane, modified polyolefin, ionomer or resins in which they are the main ingredient or their mixtures. Primers particularly well suitable for use in the present invention are resins having polyolefin oxide or modified polyolefin dispersed in the base resin used to form the primer coating. Examples of base resins are epoxy resin, phenol resin, amino resin, polyester resin, alkyd resin and heat curing alkyd resin monomer or combinations of two or more of these or other thermoplastic resins.

Polyolefin oxide is a substance obtained by oxidizing polyolefins such as polyethylene or polypropylene or their copolymers in the molten or dissolved state. The oxygen therein is believed to be present partly in the form of polymer chain end carboxyl groups or carboxylic ester groups, and partly in the form of either groups and ketone groups intermediate on the polymer chain. Modified polyolefin means polyolefin graft modified mainly by unsaturated carboxylic acid or its derivates (at a graft rate preferably of 0.001-10 wt %).

The above primer will ordinarily be obtained by mixing a solution of the base resin dissolved in an organic solvent with a solution of polyolefin oxide or modified polyolefin dissolved in such as hot xylene or Decalin. Ordinarily the polyolefin oxide or modified polyolefin will be 3-30 parts by weight per 100 parts by weight of the base resin.

The paint amount (nonvolatile fraction) of the primer layer should be about 30-150 mg/dm$^2$. The primer layer may cover the entire inner surface of the metal shell or it may cover only the bottom part.

In this case, the polyolefin oxide or modified polyolefin in the primer layer will ordinarily have a melting point or softening point of a temperature capable of thermal adhesion with the lining layer.

Anti-corrosion coating 2" is not necessarily required in cases when the primer layer covers the entire inner surface of the metal shell, but when it is applied, it will be selected from known undercoating paints such as phenol-epoxy, epoxy-amino and phenol-epoxy-vinyl resins.

In the case of prize caps, the prize marking is printed on anti-corrosion coating 2" or on the primer layer.

The metal cap of the present invention is manufactured as follows.

An anti-corrosion coating and/or printing 2' is applied to one surface of a metal sheet that is to comprise the shell material, preferably aluminum or aluminum alloy sheet. An anti-corrosion coating 2" is applied to the other surface of the sheet if such coating or printing is desired. A primer is then applied onto anti-corrosion coating 2" after which the sheet is annealed. The annealed coated sheet is then pressed into cap form with the primer layer being on the inner surface.

It is important that the bottom inner surface of the metal shell that has been formed be heated in a manner that a part of the lining layer is thermally adhered. There are no particular restrictions as to the method of heating the shell bottom for this purpose and any heating method can be adopted such as local hot blast heating, frame heating, infrared ray heating, electric resistance heating, laser heating, electron beam heating and high frequency induction heating. However methods other than high frequency induction heating will have difficulty in sufficiently satisfying the conditions needed for the industrial production of the metal cap of the present invention such as heat efficiency, heating atmosphere, compactness of apparatus, high speed continuous heating, temperature control and local heating only in desired positions on the shell bottom.

Consequently it is preferred that the high frequency induction heating method be adopted in the manufacture of the metal cap of the present invention.

Figure 4:
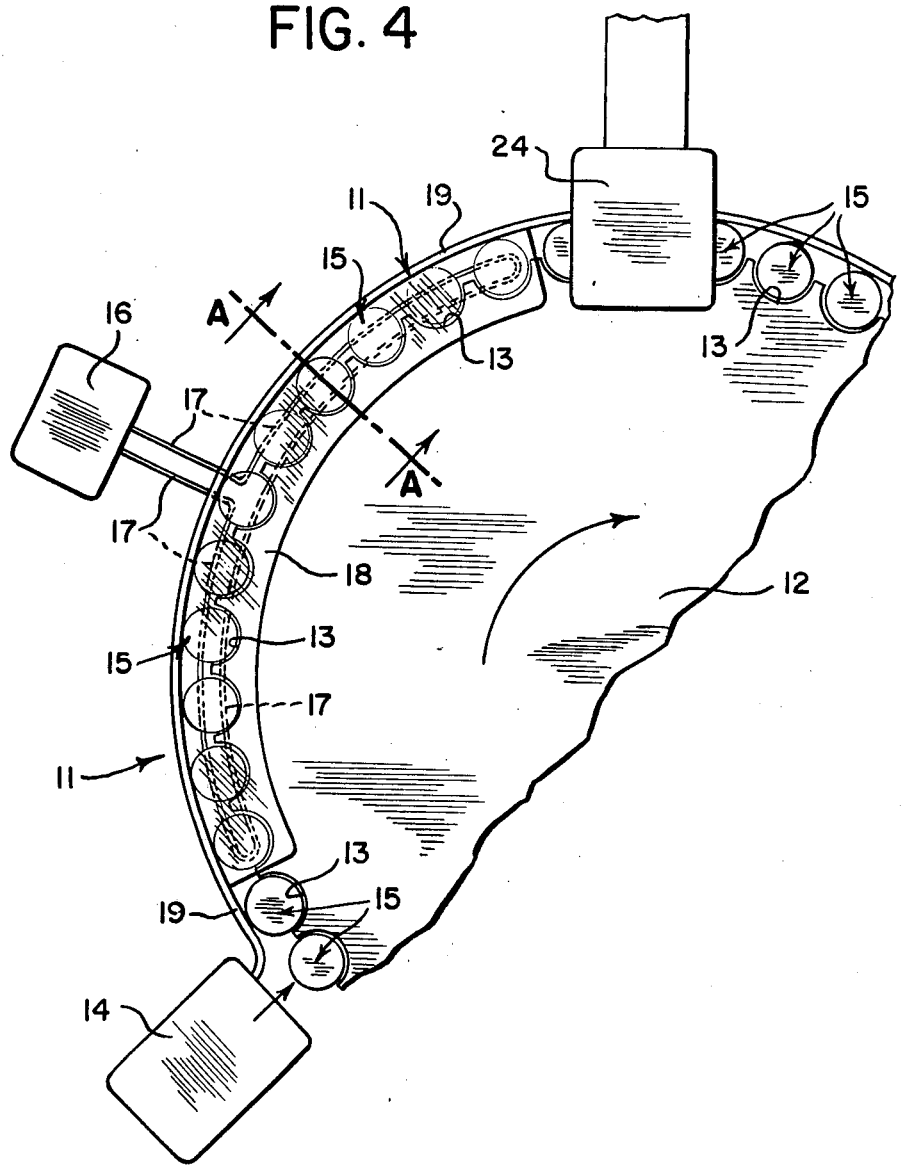
FIG. 4 is a partial plan view of an apparatus for manufacturing the cap illustrated in FIG. 1.

Referring to FIG. 4, there is illustrated a continuous high frequency induction heating apparatus 11 by which a metal shell may be heated. A plurality of semicircular notches 13 are provided at intervals in the peripheral part of a rotating table 12 comprising a transport means for shells 15 and shells 15 are charged to notches 13 from a chute 14 with their bottom sides down. A charged shell 15 is transported in the rotational direction of the rotating table 12 (direction of the arrow in the drawing) and is charged to a heating apparatus 11. The shell slides on guides (not illustrated) positioned before and after the heating apparatus.

Heating apparatus 11 comprises high frequency electric conductors 17 connected to a high frequency power source 16. A guide panel 18 and vertical guide 19 also form part of the heating apparatus.

Figure 5:
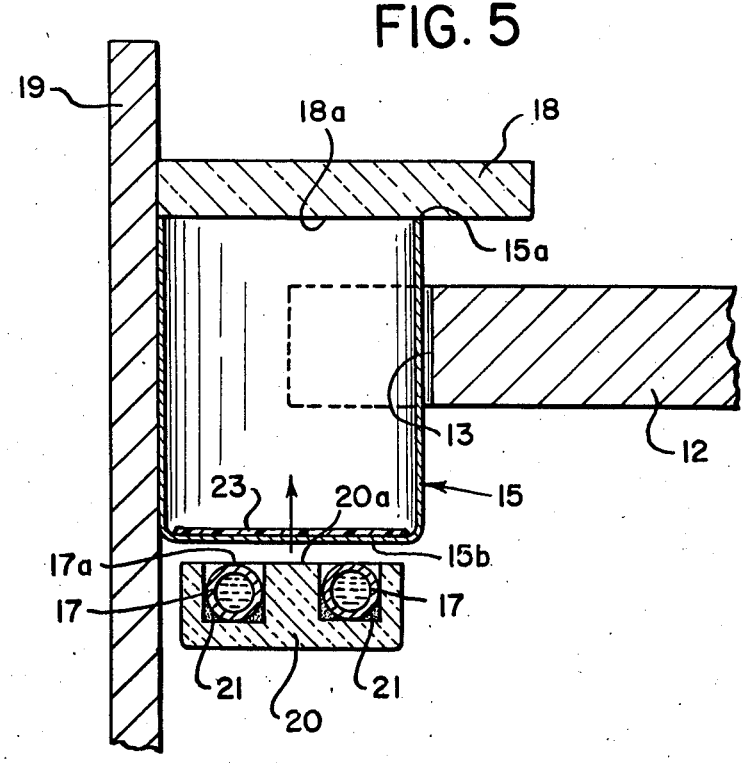
FIG. 5 is an enlarged sectional view of FIG. 4 taken along lines A—A.

FIG. 5 shows a vertical section of the heating apparatus 11 and in that figure a pair of high frequency electric conductors 17 are illustrated where the direction of the current in each conductor is mutually opposite.

Figure 6:
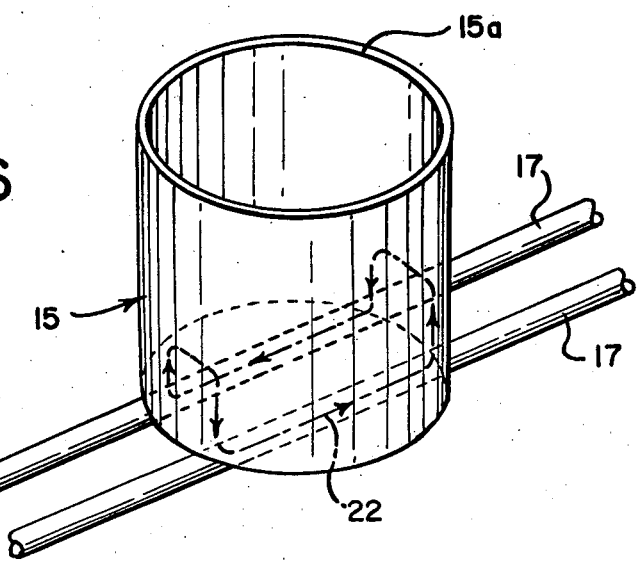
FIG. 6 is a diagrammatic view illustrating the flow of induced current in a metal shell.

As shown in FIG. 6, when the directions of the current in the conductors are mutually opposite, the induction current that is excited in the bottom of the shell directly over the conductors and the shell wall forms a closed circuit 22 in which the current flows in large amounts so that a local temperature rise is efficiently accomplished by Joule heating. If the directions of the current were the same, the closed circuit shown in FIG. 6 would not be formed and the efficiency of induction current excitation would be low resulting in little temperature rise. Further no temperature rise would occur in the case of a single conductor as no circuit would be formed.

Ordinarily when a metal shell comprises a magnetic material such as tin plate, induction heating occurs at good efficiency because the magnetic flux concentrates on the bottom of the shell. But in the case of a non-magnetic shell, such as aluminum, efficiency is poor because of considerable leakage of the magnetic flux. Yet in either case, induction current flows only in the parts directly over the conductors or in their vicinity. Consequently, since the temperature of the shell areas outside the heated portions directly over or nearly over the conductors rises only because of heat conduction from the heated portions, these outside areas will remain at lower temperatures during the initial heating phase. However with passage of time, the temperature rise over the conductors slows down and since the metal is a good heat conductor, the temperature difference between the two parts decreases. Consequently, thermal adhesion of just a part of the lining layer is difficult. The time involved will vary depending on the dimensions of the shell, sheet thickness, material, distance between the conductors and the shell bottom, diameter of the conductors, distance between the conductors, strength of the high frequency current and its frequency. Ordinarily as shown in FIG. 7, the shell heating time, that is the time for passage through heating apparatus 11, should be about one second maximum, about two seconds maximum and about four seconds maximum respectively for shell bottom diameters of 15–25 mm, 26–40 mm and 41–60 mm.

FIG. 7 using the thermal adhesion configuration illustrated in FIG. 3c, shows the relation between: (a) shell heating time, and (b) the temperature in the central part of the shell when the shell has been heated by high frequency induction (line 1a and 2a) and the temperature of a point outside the center of the shell by a distance of radius $\times \frac{2}{3}$ (curves 1b and 2b). The measurements were obtained by thermopaint. In this Figure, lines 1a and 1b show a case when a tin plate shell 27 mm in diameter and 0.27 mm thick is heated by the heating apparatus 11 of FIG. 4 using a 400 kHz high frequency power source and high frequency heating coils with the distance between the centers of the conductors being set at 7 mm, conductor diameter 4 mm, conductor length, (current flow in one conductor) 800 mm, and distance between the conductor ends and the shell bottom at 0.3 mm. FIG. 7 shows an example of temperature variations at the shell center and at a point separated from the center by radius $\times \frac{2}{3}$. Further, the output was regulated so that the temperature in the center part was a constant 160° C.

Also, lines 2a and 2b of FIG. 7 respectively show the case when an aluminum shell 38 mm in diameter and 0.2 mm thick was heated by heating apparatus comprising a distance on centers between conductors of 10 mm, conductor diameter 6 mm, conductor length 1,000 mm, and a distance between the conductor ends and the shell bottom of 0.3 mm, and show an example of temperature variations at the shell center and at a point separated from the center by radius $\times \frac{2}{3}$.

The interval between conductors can be designed for any desired position or size of non-adhesive parts, for example, they can be separated as in FIG. 3a or can be adjoining as in FIG. 3b. The diameters of the conductors will generally increase together with the diameter of the shell. For example, for shell diameters of 15–25 mm, 26–40 mm and 41–60 mm, the conductor diameters should respectively be about 3 mm, about 5 mm and about 7 mm. This is because the greater the shell diameter, the greater the need for larger current flows in the conductors and when the diameter of the conductor is small, the Joule loss in the conductor becomes large. On the other hand, when the conductor diameter increases, the electromagnetic coupling between the conductor and the cap decreases and heating efficiency declines. Further it is desirable to have the diameter of the conductor as small as possible in order to impart a non-uniform temperature distribution.

In order to prevent occurrence of variations in induction current amount on the shell bottom because of slight differences in the distance between the shell bottom and the conductors and the consequent variations in heating temperature and in order to prevent short circuits between the shell bottom and the conductors, the conductors should be contained, as shown in FIG. 5, in attachment 20, which is made of synthetic resin such as Bakelite (when using vacuum tube-type generators) or of an insulating high permeability material such as ferrite (when using transistor-type generators). An adhesive 21 such as epoxy resin holds the conductors in the attachment so that the conductors will not move unstably during heating.

High frequency power source 16 can be any type desired but a vacuum tube-type should be used for high frequencies of 100 kHz to 10 MHz, and a transistor-type should be used for frequencies on the order of 10 kHz to 80 kHz.

The smaller the distance between the conductors and the shell bottom, the larger the non-uniformity in heating temperature on the shell bottom and the greater the rise in heating efficiency. Consequently when highly permeable material is not used in attachment 20, the distance between the upper ends of the conductors 17a and shell bottom surface 15b should be 1 mm maximum and preferably 0.5 mm maximum. Distances closer than about 0.1 mm may lead to short circuits and should not be used. When using insulating high permeability materials in the attachment, the distance between attachment upper surface 20a and shell bottom surface 15b should be 2 mm maximum, and preferably 1 mm maximum. In this case, since the ferrite ordinarily used as the insulating high permeability material is brittle, it is necessary to protect the upper surface of the attachment with an insulating sheet such as Bakelite of a thickness of about 0.4 mm, so that it will be difficult to make the distance between the upper surface of the attachment and the shell bottom lower than 0.4 mm.

In the case of a shell that is non-magnetic such as aluminum, the above distances are regulated by varying the height of guide panel 18. Here guide panel 18 receives and supports the shell after it floats up from the repulsion force formed by the high frequency coil magnetic field and the induction current induced in the shell and its lower surface 18a has the function of sliding along open end 15a of shell 15 as it is driven by transport means 12.

The best guide panel is a strengthened glass plate with a smooth surface. When the shell is made of magnetic material such as tin plate, it will not ordinarily float up so that the distance is regulated by the thickness of an insulating film such as Teflon film placed over the conductor.

When it is desired to form a non-adhesive part as shown in FIG. 3c by rotating the shell during heating, a lining of a low friction material, such as Teflon is applied, in the parts where the shell contacts notch 13 while a lining of an elastic matrial such as silicon rubber having a comparatively higher friction coefficient is applied to the inner surface of vertical guide 19 with which the shell comes in contact. The shell will then be rotated when moved by the transport means 12 transported with its walls pressing against the inner surface of vertical guide 19.

A shell that has been heated as described above then passes through guides, not illustrated, and enters molten thermoplastic resin supply apparatus 24 where an extrusion apparatus supplies a molten thermoplastic resin particle nearly in the center of the shell's inner surface.

Then the cap is delivered to a press station, not illustrated, where the molten thermoplastic resin particle is compressed and elongated to sheet form with a cooled punch and hardens to become a lining layer thermally adhered to those parts of the shell bottom heated to those temperatures where thermal adhesion is possible.

The present invention will not be restricted to the example described above, for instance, it is possible to drop the particle of molten thermoplastic resin into the shell before heating, or, after inserting a thermoplastic resin film cut to the prescribed form to heat the shell and then adhere by pressing.

The metal cap of the present invention is one where the lining layer can be easily peeled from the primer layer making it well suitable for use as a prize cap. Peelability of the lining layer can be easily regulated by such as heating temperature and by selection of combinations of liner resins and the resins that will comprise the primer layer. For example, when a polyethylene liner is adhered to a primer layer comprising a base resin including polyethylene oxide and modified polyethylene, it is possible to make peeling easy by using modified polyethylene or polyethylene oxide modified to a low degree, or to lower the adhesive strength by reducing the content of both.

Weak adhesion begins from the point where the heating temperature of the shell bottom is about 30–40° C. lower than the softening point of the polyolefin oxide or modified polyolefin, and up to a certain fixed temperature, the thermal adhesive strength increases as the temperature rises. Since the highest temperature on the shell bottom is at the part directly over end 17a on the conductors and the temperature gradually decreases away from this part, a slope in adhesive strength (peeling strength) occurs in the thermal adhesion part, as shown for the example of the present invention (A-1) in Table 1. This is a great point of difference with prior metal caps where the adhesive primer was painted locally or where an adhesion inhibiting ink was printed to make the lining layer locally adhesive. The metal cap of the present invention, particularly the cap where the vicinity of the center of the shell bottom is made thermally adhesive as shown in FIG. 3c has the characterizing feature, as described above, that the adhesive strength gradually increases toward the center of the bottom. Consequently, because of the residual stress in the radial direction formed in the liner when the liner is formed by press forming the particle of molten thermoplastic resin (for example, polyethylene), there is no likelihood that the liner will peel over passage of time. Also the outer periphery of the lining layer, that is part 4a presses against the container mouth upper part during capping, is in a nonadhesive state with the primer layer and is thus easily modified under pressure imparted during capping so that compared to prior metal caps comprising adhesive lining layers over their entire surfaces, no unreasonable stresses impinge on the said part 4a. Consequently, it has the characterizing features that environmental stress destruction through the medium of the contained beverage will have difficulty occuring, and leakage of the contents because of incomplete sealing will also have difficulty occurring.

The invention is further explained by reference to the following.

EXAMPLE 1

A primer was made by dissolving or blending 90 parts by weight of epoxy resin, 10 parts by weight of phenol resin, and 7 parts by weight of polyethylene oxide (mean molecular weight 6,500, density 0.98, acid value 13.0, softening temperature 122° C.) in a mixed organic solvent (equivalent solvent mixture of methylisobutyl and methylethylketone) so that the solid fraction comes to 30 wt. %.

The paint was painted onto degreased lustrous 0.27 mm thick tin plate with the surface tin melted and heating was done in an electric oven at 200° C. for 10 minutes to obtain a coated tin plate (A) having a coating of 100 mg/dm$^2$.

Then, a part of coated tin plate (A) was printed with an adhesion inhibiting alkyd ink in an annular shape 26.6 mm outer diameter and 16.6 mm inner diameter to make partially printed coated tin plate (B).

The above coated tin plates (A) and (B) with their coated surfaces inside were made into crown seals (diameter 27 mm) by a conventional press forming method. However, with coated tin plate (B), the annular partial printing was formed so that it registered exactly at the outer periphery of the crown seal bottom.

From the above two types of crown shells, the following three types were made comprising one type being a crown following the present invention and two other types following prior technology to serve as comparisons.

(1) Crown A-1 following the present invention.

Crown shells made from coated tin plate (A) were heated with high frequency in the manner shown in FIG. 3c, with the heating apparatus of FIG. 4. At this time the high frequency induction heating coil having a coil conductor distance on centers of 7 mm, conductor diameter of 4 mm and conductor length of 800 mm was arranged so that the distance between the upper end of the coil conductor and the shell bottom was 0.3 mm. The temperature distribution on the shell bottom was as shown by curve 1 in FIG. 8 from the results of measurements of the shell bottom surface temperature by thermopaint with an input of 15 kW to a 400 kHz high frequency heating apparatus and with the passage of the shell through the heating coil in 0.7 seconds. Also, the shell made about nine revolutions during this time. A 900 mg particle of molten polyethylene (MI=3, density 0.918) was inserted into the crown shell which had been extruded from an extruder (diameter 40 mm, L/D 16) fitted with a die having an extrusion opening 8 mm in diameter. The polyethylene was then pressed with a cooled punch to make a crown having a low density liner.

(2) Crown A-2 (comparative example).

Crown shells formed from coated tin plate (A) were heated by high frequency in the same manner as A-1 (except that the heating time was five seconds). Heating was done nearly uniformly until the crown shell bottom temperature reached 150° C. and then molten low density polyethylene was inserted as before to make the crown.

(3) Crown B-1 (comparative example).

Crowns were made by entirely the same method as for crown A-2 using crown shells formed from coated tin plate (B).

The following measurements and evaluations were made of the above three types of crowns.

Adhesive strength: Samples 5 mm wide and 27 mm long were cut out from the crown bottoms of each type of crown immediately after forming and after standing for one week at room temperature. Measurements were made of the peeling strength between the tin plte and the polyethylene. The measurements were done using tension, peeling at 180° at a rate of 20 mm/min. and at a temperature of 20° C. The peeling strength was read on a chart as the values of four positions from the outer peripheries of the crowns to their centers. The results are shown in Table 1.

Environmental cracking: An aqueous solution of 0.01% RIPONOKKUSU NCI (made by Raion Yushi [Lion Fat & Oil Co., Ltd.]) was placed in glass bottles. The bottles were capped with the various types of crowns, let stand upside down in an atmosphere of 50° C. and were evaluated at the time F20 until 20% had cracks formed (twelve out of sixty bottles). The number of samples for each type at this time was sixty bottles.

Sealing: Commercial bottled beer (large bottles) were cooled to 4°-3° C. and opened, immediately capped with the test crowns and left on their sides for one month at 37° C. to obtain their leakage rates.

In contrast to the fact that crowns A-1 of the present invention had satisfactory performance as container covers, comparative examples A-2 and B-1 were not practical for use and had the following deficiencies. Crowns A-2 adhered over the entire surfaces, since the outer peripheries of the lining material corresponding to the bottle mouths solidified with the adhesive primer, these parts showed much more residual stress strain during capping than the non-adhesive A-1 and B-1 crowns and environmental cracking occurred very easily. On the other hand, although crown B-1 withstood environmental cracking, sealing was extremely poor compared to crown A-1 of the present invention and the adhesive strength of the liners decreased widely over passage of time. In contrast to the fact that crown A-1 had an adhesive strength in the liner that increased gradually from the peripheral part to the central part, with crown B-1 there was absolutely no distinction between the non-adhesive part and the adhesive part. Because of this, stresses remained in the liner from elongation from the center toward the periphery during liner forming, the overall adhesive strength of the liners in crown B-1 were not able to withstand the force of restitution of this residual stress, and the adhesive strength was considered to be completely lost. For this reason, although crown B-1 comprised crowns with the same adhesive parts as crown A-1, in practice sealing was surprisingly bad and they were completely unsuited for practical use.

TABLE 1

| FACTORS | | | A-1 Example of the Present Invention | A-2 Comparative Example | B-1 Comparative Example |
|---|---|---|---|---|---|
| Peeling Strength Immediately After (kg/cm) | Distance From Center | 13 mm | 0 | 1150 | 0 |
| | | 11 mm | 250 | 1120 | 0 |
| | | 8 mm | 980 | 1140 | 1130 |
| | | 4 mm | 1140 | 1120 | 1130 |
| | | 0 mm | 1130 | 1120 | 1140 |
| Peeling Strength After One Week | Distance From | 13 mm | 0 | 960 | 0 |
| | | 11 mm | 0 | 940 | 0 |

TABLE 1-continued

| FACTORS | | | A - 1 Example of the Present Invention | A - 2 Comparative Example | B - 1 Comparative Example |
|---|---|---|---|---|---|
| | Center | 8 mm | 540 | 940 | 0 |
| | | 4 mm | 890 | 960 | 0 |
| | | 0 mm | 900 | 940 | 100 |
| Environmental Cracking (F 20) (Days) | | | 90 Days or more | 5 | 90 Days or more |
| Sealing (%) (Leakage Rate) | | | 0.1 | 35.8 | 95.8 |

EXAMPLE 2.

80 parts by weight of molecular weight about 3,000 bisphenol A type epoxy resin, 20 parts by weight of amino resin (SUPABEKKAMIN P 138) and 4 parts by weight of anhydride maleic acid modified polyethylene were dispersed or dissolved in organic solvent so that the solid fraction was 28 wt % to make a primer. The primer was painted on aluminum sheet 0.2 mm thick and dried by heating to make a coated aluminum sheet having a coating of 100 mg/dm$^2$ and then pictures and characters indicating a "win" or a "loss" for prize purposes were printed on the coating. This printed coated sheet with the printed surface inside was pressformed into cap shells (diameter 38 mm, height 17 mm) with a conventionally known method in a manner that the pictures and characters of the printing were in the centers of the caps.

These cap shells were heated with high frequency by the method of FIG. 3c with the heating apparatus of FIG. 4. At this time the high frequency induction heating coil with a distance of the conductors between centers of 10 mm, coil conductor diameter 6 mm, and coil conductor length 1,000 mm was arranged so that the distance between the upper end of the coil conductors and the shell bottoms was 0.3 mm. Further, the temperature distribution was as shown by curve 2 in FIG. 8 from the results of measurements of the shell bottom surface temperature by thermopaint. The conductors were connected to a 400 kHz generator with an input to the high frequency generator of 15 kWh. Passage time of the shells through the heating apparatus was 1 second and the number of shell revolutions at this time was about eight.

One gram particles of molten polyethylene were inserted into the heated shells by the method of Example 1, and they were compressed with a cooled punch to make caps having polyethylene liners. These caps were used to seal glass bottles containing one liter of carbonated beverage and although stored for three months at room temperature, they showed absolutely no problems in sealing.

Also, when the liners of the caps were given unsealing evaluations by twenty women and children, they peeled very easily and the "wins" and "losses" could be distinguished. Further, in the same manner as in Example 1, the adhesive strength from the outer periphery to the central part was zero (19), 120 (10), 820 (5) and 815 (zero) kg/cm (where the values in parens are distances in mm from the center).

We claim:

1. In a metal cap having a primer layer thereon covering the entire bottom surface thereof and a lining layer the underside of which overlies and completely contacts said primer layer and where the cap is adapted for sealing the open ends of containers; the improvement comprising in that said primer layer has a thermal adhesiveness with respect to said lining layer upon the heating of the cap and in that only a part of the lining layer at the bottom of the cap is thermally adhesively affixed to said primer layer.

2. In a metal cap according to claim 1 having in addition an anti-corrosion layer positioned on said cap between the surface of said cap and said primer layer.

3. In a metal cap according to claim 1 wherein said lining layer comprises a thermoplastic resin.

* * * * *